(12) United States Patent
Bem et al.

(10) Patent No.: US 7,743,050 B1
(45) Date of Patent: *Jun. 22, 2010

(54) MODEL GENERATION FOR RANKING DOCUMENTS BASED ON LARGE DATA SETS

(75) Inventors: Jeremy Bem, Berkeley, CA (US); Georges R. Harik, Mountain View, CA (US); Joshua L. Levenberg, Redwood City, CA (US); Noam Shazeer, Stanford, CA (US); Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 11/736,872

(22) Filed: Apr. 18, 2007

Related U.S. Application Data

(63) Continuation of application No. 10/706,991, filed on Nov. 14, 2003, now Pat. No. 7,231,399.

(51) Int. Cl.
*G06F 17/30* (2006.01)
(52) U.S. Cl. ........................ 707/713; 707/736
(58) Field of Classification Search .................... 707/5, 707/102
See application file for complete search history.

(56) References Cited

U.S. PATENT DOCUMENTS

| | | | |
|---|---|---|---|
| 5,897,627 A | 4/1999 | Leivian et al. | |
| 5,950,186 A | 9/1999 | Chaudhuri et al. | |
| 6,006,222 A | 12/1999 | Culliss | |
| 6,014,665 A | 1/2000 | Culliss | |
| 6,078,916 A | 6/2000 | Culliss | |
| 6,088,692 A | 7/2000 | Driscoll | |
| 6,144,944 A | 11/2000 | Kurtzman et al. | 705/14 |
| 6,182,068 B1 | 1/2001 | Culliss | |
| 6,285,999 B1 | 9/2001 | Page | |
| 6,311,175 B1 | 10/2001 | Adriaans et al. | |
| 6,397,211 B1 | 5/2002 | Cooper | |
| 6,463,430 B1 | 10/2002 | Brady et al. | |
| 6,523,020 B1 | 2/2003 | Weiss | |
| 6,539,377 B1 | 3/2003 | Culliss | |
| 6,546,388 B1 * | 4/2003 | Edlund et al. | 707/5 |
| 6,546,389 B1 * | 4/2003 | Agrawal et al. | 707/6 |
| 6,651,054 B1 | 11/2003 | de Judicibus | |
| 6,714,929 B1 | 3/2004 | Micaelian et al. | |
| 6,738,764 B2 | 5/2004 | Mao et al. | |

(Continued)

OTHER PUBLICATIONS

Jeffrey A. Dean et al., "Ranking Documents Based on User Behavior and/or Feature Data"; U.S. Appl. No. 10/869,057, filed Jun. 17, 2004; 36 pages.

(Continued)

*Primary Examiner*—Neveen Abel Jalil
*Assistant Examiner*—Kellye D Buckingham
(74) *Attorney, Agent, or Firm*—Harrity & Harrity, LLP (57) ABSTRACT

A system ranks documents based, at least in part, on a ranking model. The ranking model may be generated to predict the likelihood that a document will be selected. The system may receive a search query and identify documents relating to the search query. The system may then rank the documents based, at least in part, on the ranking model and form search results for the search query from the ranked documents.

19 Claims, 5 Drawing Sheets

U.S. PATENT DOCUMENTS

| | | | |
|---|---|---|---|
| 6,751,611 | B2 | 6/2004 | Krupin et al. |
| 6,782,390 | B2 | 8/2004 | Lee et al. |
| 6,799,176 | B1 | 9/2004 | Page |
| 6,804,659 | B1 | 10/2004 | Graham et al. ............... 705/14 |
| 6,836,773 | B2 | 12/2004 | Tamayo et al. ............... 707/6 |
| 6,947,930 | B2 * | 9/2005 | Anick et al. ................ 707/5 |
| 7,007,074 | B2 | 2/2006 | Radwin ..................... 709/217 |
| 7,058,628 | B1 | 6/2006 | Page |
| 7,065,524 | B1 | 6/2006 | Lee |
| 7,080,063 | B2 | 7/2006 | Campos et al. |
| 7,089,194 | B1 | 8/2006 | Berstis et al. ............... 705/14 |
| 7,100,111 | B2 | 8/2006 | McElfresh et al. .......... 715/517 |
| 7,222,127 | B1 | 5/2007 | Bem et al. |
| 7,231,399 | B1 | 6/2007 | Bem et al. |
| 7,380,205 | B2 * | 5/2008 | Bezrukov et al. ............ 715/234 |
| 2002/0083067 | A1 | 6/2002 | Tamayo et al. |
| 2002/0161763 | A1 | 10/2002 | Ye et al. |
| 2002/0184181 | A1 | 12/2002 | Agarwal et al. |
| 2003/0195877 | A1 | 10/2003 | Ford et al. |
| 2003/0197837 | A1 | 10/2003 | Gyu Lee |
| 2004/0088308 | A1 | 5/2004 | Bailey et al. |
| 2005/0060281 | A1 * | 3/2005 | Bucher et al. ................ 707/1 |
| 2005/0071741 | A1 | 3/2005 | Acharya et al. |
| 2005/0100209 | A1 | 5/2005 | Lewis et al. |

OTHER PUBLICATIONS

Weis et al.; Rule-based Machine Learning Methods for Functional Prediction; Journal of AI Research; vol. 3; Dec. 1995; pp. 383-403.

J. Friedman et al.; Additive Logistic Regression: A Statistical View of Boosting; Technical Report; Stanford University Statistics Department; Jul. 1998; pp. 1-45.

U.S. Appl. No. 10/712,263; Jeremy Bem et al.; "Targeting Advertisements Based on Predicted Relevance of the Advertisements"; filed Nov. 14, 2003; 40 pages.

U.S. Appl. No. 10/734,584; Jeremy Bem et al.; "Large Scale Machine Learning Systems and Methods"; filed Dec. 15, 2003; 35 pages.

J.H. Friedman, T. Hastie, and R. Tibshirani; "Additive Logistic Regression: a Statistical View of Boosting"; Dept. Of Statistics, Stanford University Technical Report; Aug. 20, 1998.

A.Y. Ng and M.I. Jordan; "On Discriminative vs. Generative classifiers: A comparison of logistic regression and naïve Bayes," in T. Dietterich, S. Becker and Z. Ghahramani (eds.), Advances in Neural Information Processing Systems 14, Cambridge, MA: MIT Press, 2002.

F. Crestani, M. Lalmas, C. Van Rijsbergen and I. Campbell; "" Is This Document Relevant? . . . Probably": A Survey of Probabilistic Models in Information Retrieval"; ACM Computing Surveys, vol. 30, No. 4, Dec. 1998.

Justin Boyan et al.; "A Machine Learning Architecture for Optimizing Web Search Engines"; Carnegie Mellon University; May 10, 1996; pp. 1-8.

"Click Popularity—DirectHit Technology Overview"; http://www.searchengines.com/directhit.html; Nov. 10, 2003 (print date); 2 pages.

http://www.httprevealer.com; "Creative Use of HttpRevealer—How does Google Toolbar Work?"; Apr. 19, 2004 (print date); pp. 1-6.

U.S. Appl. No. 11/736,193; Jeremy Bem et al.; "Large Scale Machine Learning Systems and Methods"; filed Apr. 17, 2007; 35 pages.

U.S. Appl. No. 10/706,991; Jeremy Bem et al.; "Ranking Documents Based on Large Data Sets"; filed Nov. 14, 2003; 38 pages.

* cited by examiner

FIG. 5

MODEL GENERATION FOR RANKING DOCUMENTS BASED ON LARGE DATA SETS

RELATED APPLICATION

This application is a continuation of U.S. patent application Ser. No. 10/706,991, filed Nov. 14, 2003, which is hereby incorporated herein by reference.

BACKGROUND OF THE INVENTION

1. Field of the Invention

The present invention relates generally to information retrieval and, more particularly, to systems and methods for creating a ranking function from large data sets and using the ranking function to rank documents.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web documents in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web documents. Web documents that contain the user's search terms are "hits" and are returned to the user. The search engine oftentimes ranks the documents using a ranking function based on the documents' perceived relevance to the user's search terms. Determining a document's relevance can be a tricky problem.

Accordingly, there is a need for systems and methods that improve the determination of a document's relevance.

SUMMARY OF THE INVENTION

Systems and methods, consistent with the principles of the invention, create a ranking function based, at least in part, on prior information retrieval data, such as query data, user information, and document information, and use the ranking function to rank (or score) documents.

In accordance with one aspect consistent with the principles of the invention, a method for ranking documents is provided. The method may include creating a ranking model that predicts a likelihood that a document will be selected and training the ranking model using a data set that includes tens of millions of instances. The method may also include identifying documents relating to a search query, scoring the documents based, at least in part, on the ranking model, and forming search results for the search query from the scored documents.

According to another aspect, a system for ranking documents is provided. The system may include a repository and a server. The repository may store information corresponding to multiple prior searches. The server may receive a search query from a user, identify documents corresponding to the search query, and rank the identified documents based, at least in part, on a ranking model that includes rules that maximize a likelihood of the repository.

According to yet another aspect, a method for generating a model is provided. The method may include selecting candidate conditions from training data, estimating weights for the candidate conditions, and forming new rules from the candidate conditions and corresponding ones of the weights. The method may also include comparing a likelihood of the training data between a model with the new rules and the model without the new rules and selectively adding the new rules to the model based, at least in part, on results of the comparing.

According to a further aspect, a method for ranking documents is provided. The method may include receiving a search query, identifying documents relating to the search query, and determining prior probabilities of selecting each of the documents. The method may also include determining a score for each of the documents based, at least in part, on the prior probability of selecting the document and generating search results for the search query from the scored documents.

According to another aspect, a system for generating a model is provided. The system may include a repository and multiple devices. The repository may store training data that includes instances and features, where each of the features corresponds to one or more of the instances. At least one of the devices may create a feature-to-instance index that maps features to instances to which the features correspond, select a candidate condition, request information associated with the candidate condition from other ones of the devices, receive the requested information from the other devices, estimate a weight for the candidate condition based, at least in part, on the requested information, form a new rule from the candidate condition and the weight, and selectively add the new rule to the model.

According to yet another aspect, a system for generating a model is provided. The system includes a repository and multiple devices. The repository may store multiple instances. At least one of the devices may analyze a subset of the instances to identify matching candidate conditions, analyze the candidate conditions to collect statistics regarding predicted probabilities from the matching instances, gather statistics regarding one of the candidate conditions from other ones of the devices, determine a weight associated with the one candidate condition based on at least one of the collected statistics and the gathered statistics, form a rule from the one candidate condition and the weight, and selectively add the rule to the model.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention may generate a ranking model based, at least in part, on prior information retrieval data, such as data relating to users, queries previously provided by these users, documents retrieved based on these queries, and documents that were selected and not selected in relation to these queries. The systems and methods may use this ranking model as part of a ranking function to rank documents.

Exemplary Information Retrieval Network

Figure 1:
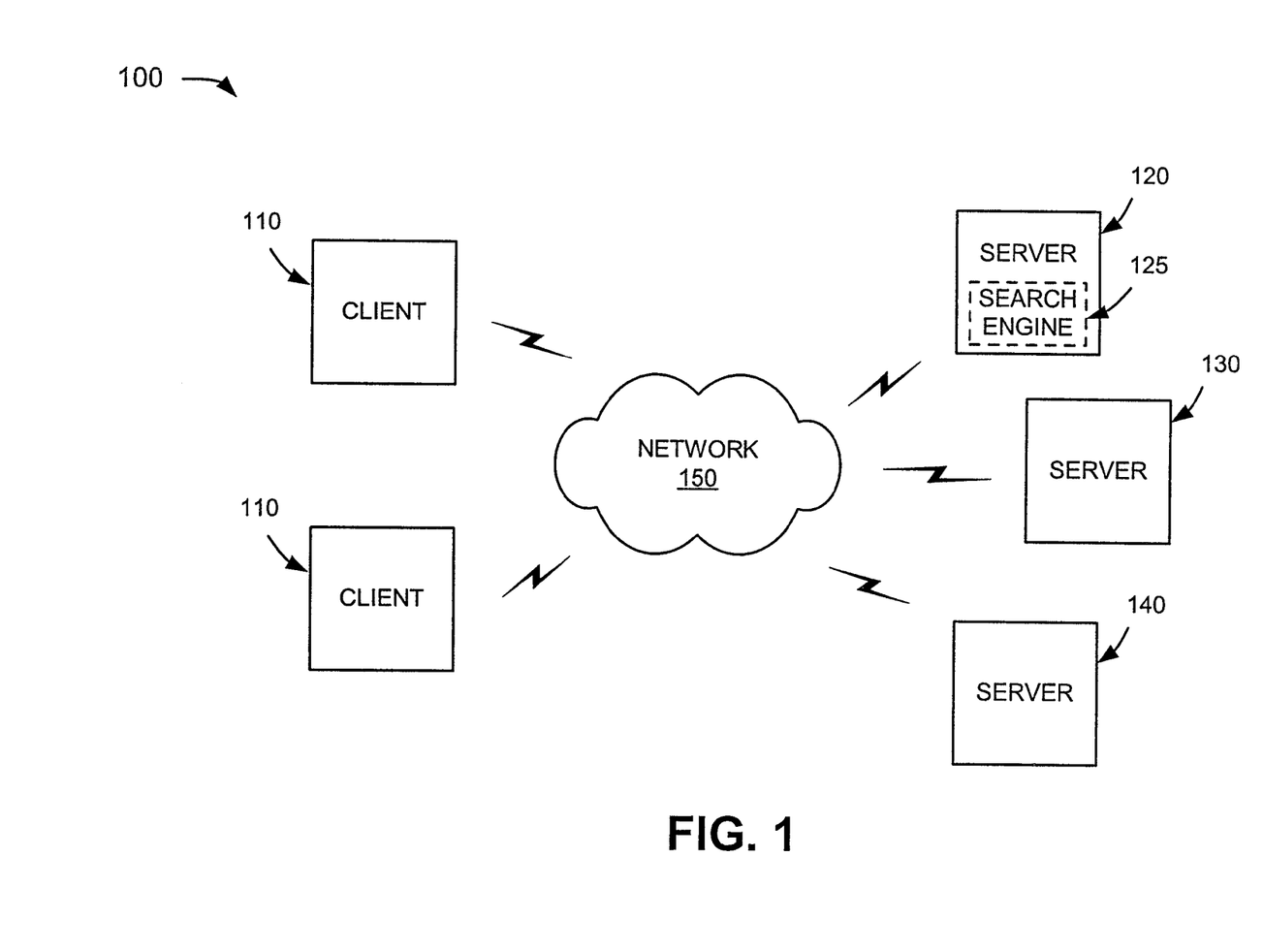
FIG. 1 is a diagram of an exemplary information retrieval network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may optionally include a search engine 125 usable by clients 110. Server 120 may crawl documents (e.g., web pages) and store information associated with these documents in a repository of crawled documents. Servers 130 and 140 may store or maintain documents that may be crawled by server 120. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible that a single one of servers 120-140 is implemented as multiple, possibly distributed, devices.

Exemplary Model Generation System

Figure 2:
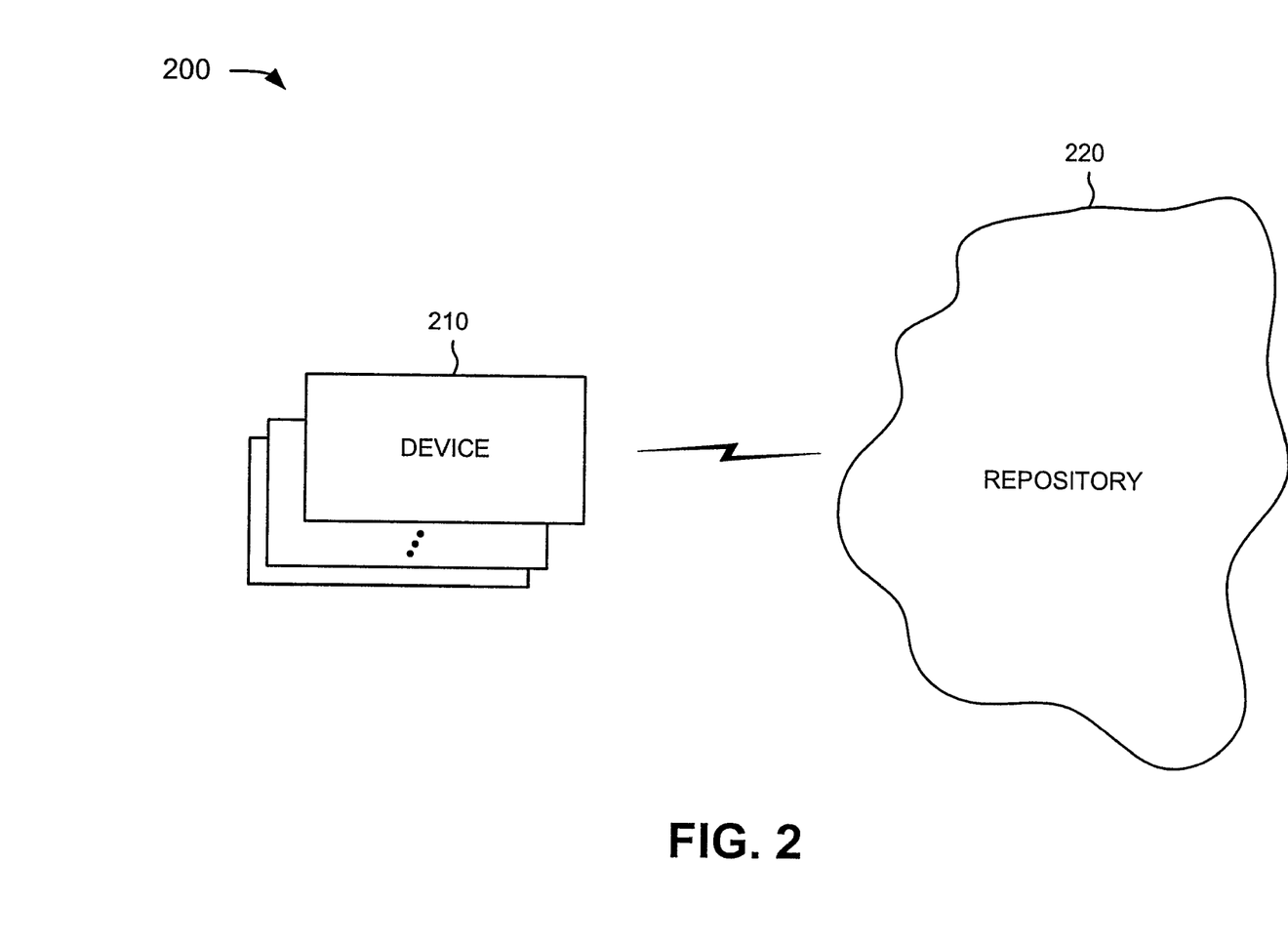
FIG. 2 is a diagram of an exemplary model generation system according to an implementation consistent with the principles of the invention.

FIG. 2 is an exemplary diagram of a model generation system 200 consistent with the principles of the invention. System 200 may include one or more devices 210 and a repository 220. Repository 220 may include one or more logical or physical memory devices that may store a large data set (e.g., tens of millions of instances and millions of features) that may be used, as described in more detail below, to create and train a ranking model. The data may include information retrieval data, such as query data, user information, and document information, that may be used to create a model that may be used to rank a particular document. The query data may include search terms previously provided by users to retrieve documents. The user information may include Internet Protocol (IP) addresses, cookie information, query languages; and/or geographical information associated with the users. The document information may include information relating to the documents presented to the users and the documents that were selected and not selected by the users. In other exemplary implementations, other types of data may alternatively or additionally be stored by repository 220.

Device(s) 210 may include any type of computing device capable of accessing repository 220 via any type of connection mechanism. According to one implementation consistent with the principles of the invention, system 200 may include multiple devices 210. According to another implementation, system 200 may include a single device 210. Device(s) 210 may correspond to one or more of servers 120-140.

Figure 3:
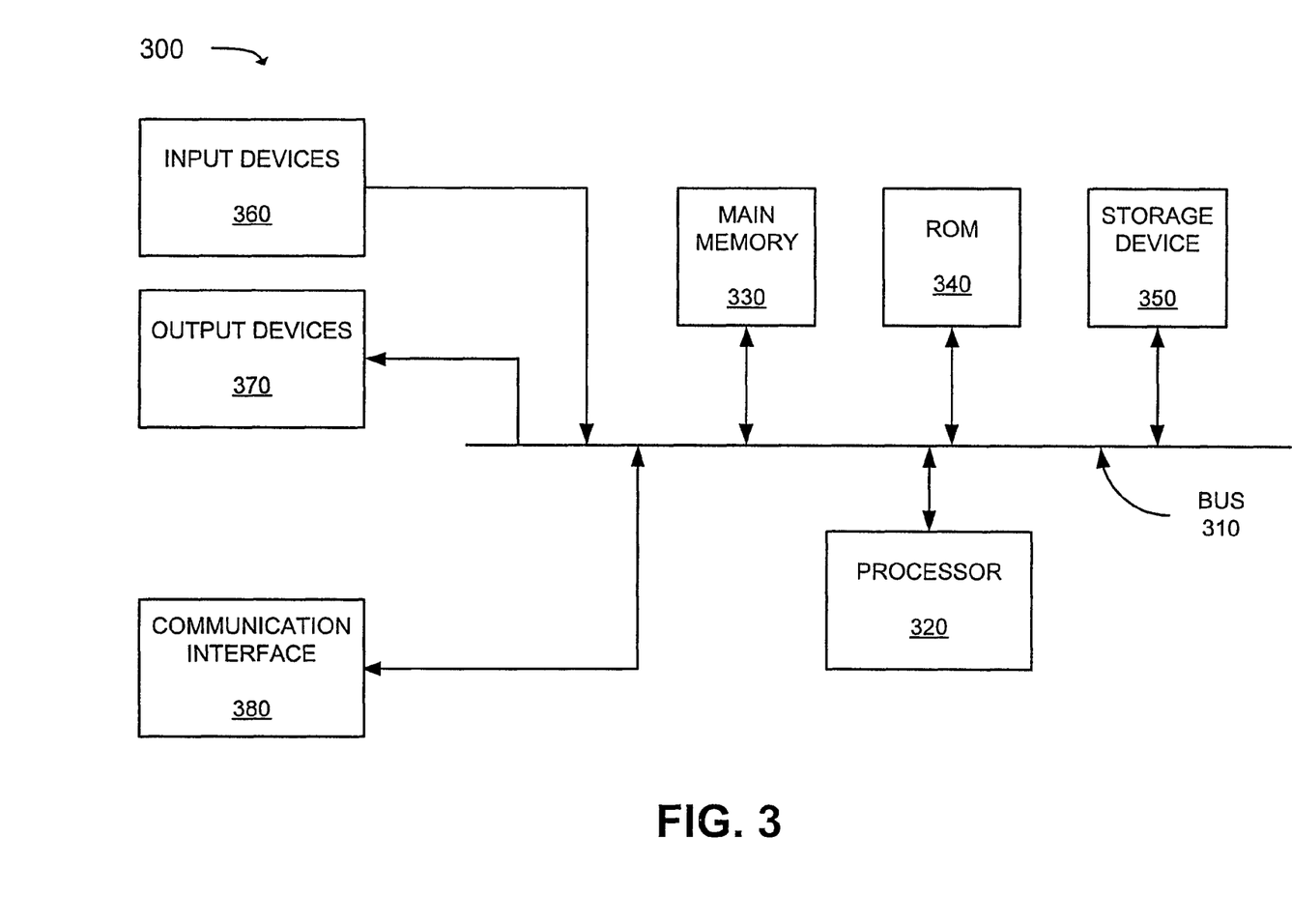
FIG. 3 is an exemplary diagram of a device according to an implementation consistent with the principles of the invention.

FIG. 3 is an exemplary diagram of a device 300 according to an implementation consistent with the principles of the invention. Device 300 may correspond to one or more of clients 110, servers 120-140, and device(s) 210. Device 300 may include a bus 310, a processor 320, a main memory 330, a read only memory (ROM) 340, a storage device 350, one or more input devices 360, one or more output devices 370, and a communication interface 380. Bus 310 may include one or more conductors that permit communication among the components of device 300.

Processor 320 may include any type of conventional processor or microprocessor that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device(s) 360 may include one or more conventional mechanisms that permit an operator to input information to device 300, such as a keyboard, a mouse, a pen, voice recognition and/or biometric mechanisms, etc. Output device(s) 370 may include one or more conventional mechanisms that output information to the operator, including a display, a printer, a speaker, etc. Communication interface 380 may include any transceiver-like mechanism that enables device 300 to communicate with other devices and/or systems.

As will be described in detail below, device 300, consistent with the principles of the invention, may perform certain data-related operations. Device 300 may perform these operations in response to processor 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 causes processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Model Generation Processing

For purposes of the discussion to follow, the set of data in repository 220 (FIG. 2) may include multiple elements, called instances. It may be possible for repository 220 to store more than 50 million instances. Each instance may include a triple of data: (u, q, d), where u refers to user information, q refers to query data provided by the user, and d refers to document information relating to documents retrieved as a result of the query data and which documents the user selected and did not select.

Several features may be extracted for any given (u, q, d). These features might include one or more of the following: the country in which user u is located, the time of day that user u provided query q, the language of the country in which user u is located, each of the previous three queries that user u provided, the language of query q, the exact string of query q, the word(s) in query q, the number of words in query q, each of the words in document d, each of the words in the Uniform Resource Locator (URL) of document d, the top level domain in the URL of document d, each of the prefixes of the URL of document d, each of the words in the title of document d, each of the words in the links pointing to document d, each of the words in the title of the documents shown above and below document d for query q, the number of times a word in query q matches a word in document d, the number of times user u has previously accessed document d, and other information. In one implementation, repository 220 may store more than 5 million distinct features.

To facilitate fast identification of correspondence between features and instances, a feature-to-instance index may be generated that links features to the instances in which they are included. For example, for a given feature f, the set of instances that contain that feature may be listed. The list of instances for a feature f is called the "hitlist for feature f." Thereafter, given a set of features $f_0, \ldots, f_n$, the set of instances that contain those features can be determined by intersecting the hitlist for each of the features $f_0, \ldots, f_n$.

Other information may also be determined for a given (u, q, d). This information may include, for example, the position that document d was provided within search results presented to user u for query q, the number of documents above document d that were selected by user u for query q, and a score ("old score") that was assigned to document d for query q. The old score may have been assigned by search engine 125 or by another search engine.

A ranking model may be created from this data. The model uses the data in repository 220 as a way of evaluating how good the model is. The model may include rules that maximize the log likelihood of the data in repository 220. The general idea of the model is that given a new (u, q, d), the model may predict whether user u will select a particular document d for query q. As will be described in more detail below, this information may be used to rank document d for query q and user u.

Figure 4:
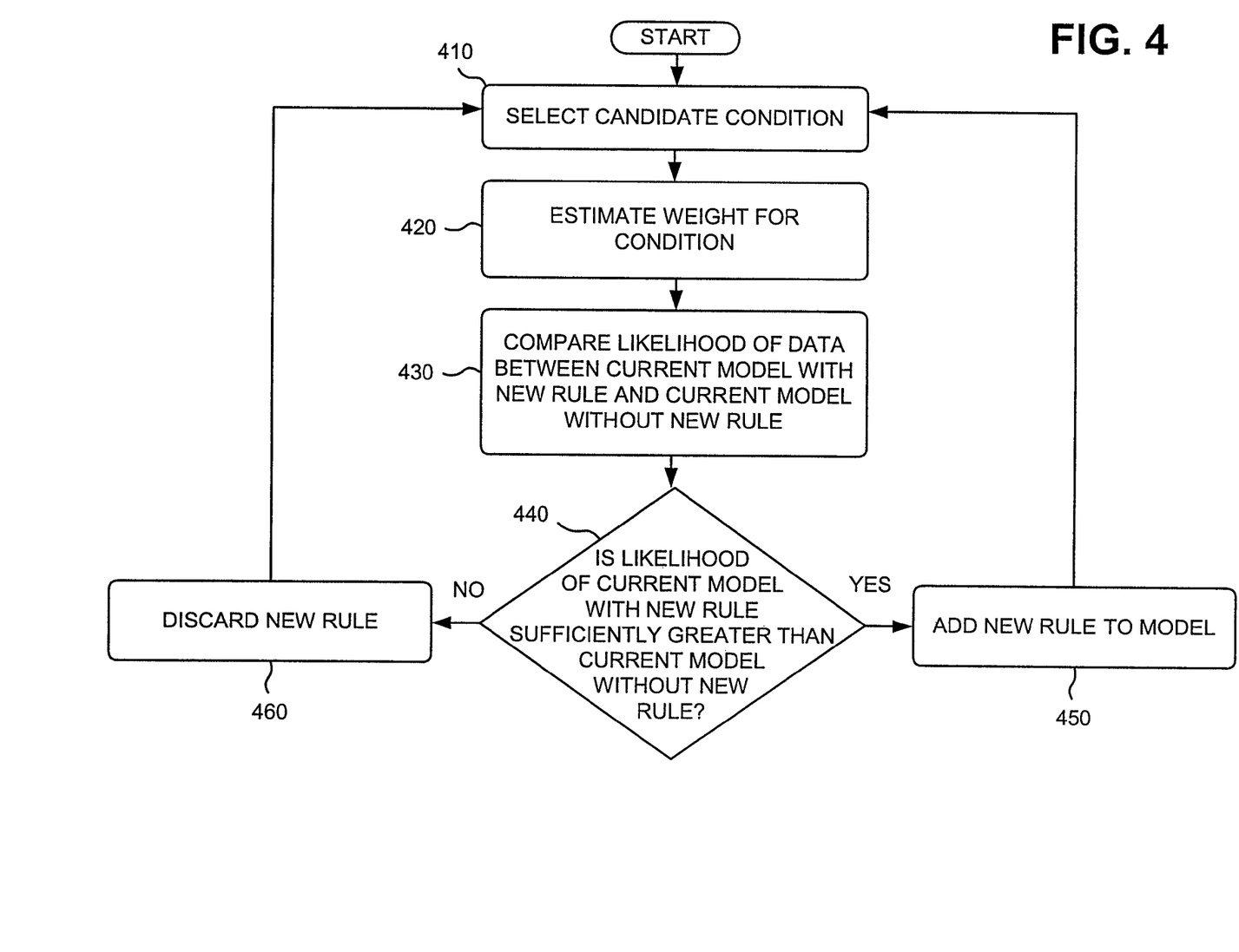
FIG. 4 is a flowchart of exemplary processing for generating a ranking model according to an implementation consistent with the principles of the invention.

FIG. 4 is a flowchart of exemplary processing for generating a ranking model according to an implementation consistent with the principles of the invention. This processing may be performed by a single device 210 or a combination of multiple devices 210.

To facilitate generation of the ranking model, a prior probability of selection may be determined. As described above, the following information may be determined for any given instance (u, q, d): the position that document d occupied within the search results presented to user u for query q; the old score that was assigned to document d for query q; and the number of documents above document d that were selected by user u for query q. Based on this information, a function may be created that maps from these three values to a probability of selection:

P(select|position, old score, number of selections above).

This "prior" probability of selection may provide the initial probability of document selection without considering any of the features. It uses the position, the old score, and the number of selections of documents above this document.

A set of instances based on the same or a different set of instances may be used as "training data" D. For each instance (u, q, d) in the training data D, its features $(f_0, f_1, \ldots, f_n)$ may be extracted. For example, $f_o$ may be the feature corresponding to "the word 'tree' appears in the query." In this implementation, the feature $f_0$ may include a boolean value, such that if "tree" appears in query q then the value of $f_0$ is one, otherwise the value of $f_0$ is zero. In other implementations, the features may include discrete values. It may be assumed that many of the features will have values of zero. Accordingly, a sparse representation for the features of each instance may be used. In this case, each instance may store only features that have non-zero values.

Therefore, for each instance (u, q, d), the following information is available: its set of features, whether document d was selected by user u for query q, and its prior probability of selection. A "condition" C is a conjunction of features and possibly their complements. For example, a condition that includes two features is: "tree" is in query q and the domain of document d is "trees.com," and a condition that includes a feature and a complement of a feature is: "football" is in query q and the user did not provide the query from "www.google.co.uk." For any instance (u, q, d), the value of its features may determine the set of conditions C that apply. A "rule" is a condition C and a weight w, represented as (C, w). The ranking model M may include a set of rules and a prior probability of selection. To generate the model M, the set of conditions $C_1, \ldots, C_n$ and the values of the weights $w_1, \ldots, w_n$ need to be determined.

Based on this information, a function may be created that maps conditions to a probability of selection:

P(select|$C_1, \ldots C_n$, position, old score, number of selections above).

The posterior probability of a selection given a set of conditions, P(select|$C_1, \ldots, C_n$, position, old score, number of selections above), may be determined using the function:

Log {P(select=false|$C_1, \ldots, C_n$, position, old score, number of selections above)/P(select=true|$C_1, \ldots C_n$, position, old score, number of selections above)}=$\text{Sum}_i\{-w_iI(C_i)\}$+Log {P(select=false|position, old score, number of selections above)/P(select=true|position, old score, number of selections above)}, where $I(C_i)$=0 if $C_i$=false, and $I(C_i)$=1 if $C_i$=true.

To generate the model M, processing may start with an empty model M that includes the prior probability of selection. A candidate condition C may be selected (act 410). In one implementation, candidate conditions may be selected from the training data D. For example, for each instance in the training data D, combinations of features that are present in that instance (or complements of these features) may be chosen as candidate conditions. In another implementation, random sets of conditions may be selected as candidate conditions. In yet another implementation, single feature conditions may be considered for candidate conditions. In a further implementation, existing conditions in the model M may be augmented by adding extra features and these augmented conditions may be considered as candidate conditions. In yet other implementations, candidate conditions may be selected in other ways.

A weight w for condition C may then be estimated (act 420). The weight w may be estimated by attempting to maximize the log likelihood of the training data D given the model M augmented with rule (C, w)—that is, find the weight that maximizes Log P(D|M, (C, w)), where "M, (C, w)" denotes the model M with rule (C, w) added if condition C is not already part of the model M, and w is the weight for condition C.

The likelihood of the training data D may be compared between the current model with the new rule (C, w) and the current model without the new rule (i.e., P(D|M, (C,w)) vs. P(D|M)) (acts 430 and 440). If P(D|M, (C,w)) is sufficiently greater than P(D|M), then the new rule (C, w) is added to the model M (act 450). A penalty or "Cost" for each condition C may be used to aid in the determination of whether P(D|M, (C,w)) is sufficiently greater than P(D|M). For example, if condition C includes many features, or if the features of condition C are quite rare (e.g., "does the word 'mahogany' appear in the query"), then the cost of condition C could be high. The rule (C,w) may then be added to the model M if:

$$\text{Log } \{P(D|M,(C,w))\} - \text{Log } \{P(D|M)\} > \text{Cost}(C).$$

If P(D|M, (C,w)) is not sufficiently greater than P(D|M), then the new rule (C, w) is discarded (i.e., not added to the model M), possibly by changing its weight to zero (act 460). In either event, processing may then return to act 410, where the next candidate condition is selected. Processing may continue for a predetermined number of iterations or until all candidate conditions have been considered.

Exemplary Process for Ranking Documents

Figure 5:
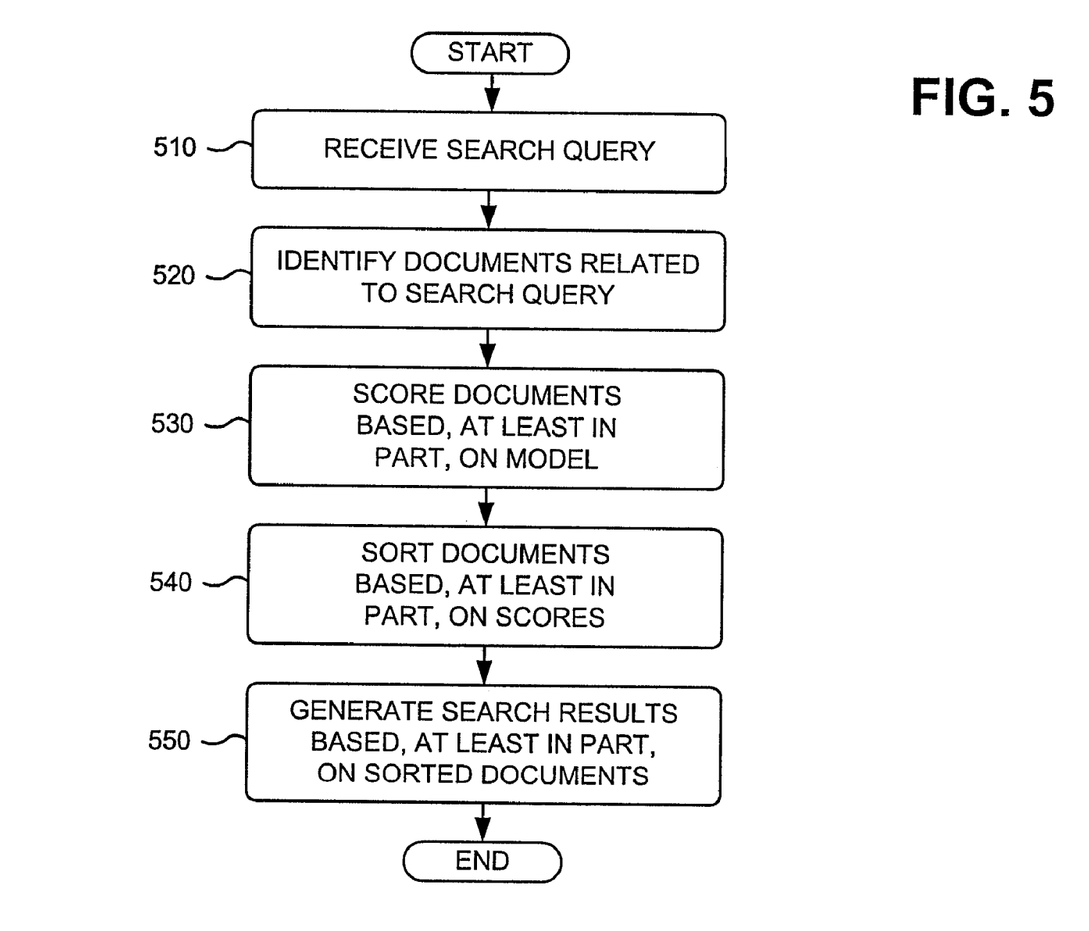
FIG. 5 is a flowchart of exemplary processing for ranking documents according to an implementation consistent with the principles of the invention.

FIG. 5 is a flowchart of exemplary processing for ranking documents according to an implementation consistent with the principles of the invention. Processing may begin with a user providing one or more search terms as a search query for searching a document corpus. In one implementation, the document corpus is the Internet and the vehicle for searching this corpus is a search engine, such as search engine 125 (FIG. 1). The user may provide the search query to search engine 125 via web browser software on a client, such as client 110 (FIG. 1).

Search engine 125 may receive the search query and act upon it to identify documents (e.g., web pages) related to the search query (acts 510 and 520). A number of techniques exist for identifying documents related to a search query. One such technique might include identifying documents that contain the one or more search terms as a phrase. Another technique might include identifying documents that contain the one or more search terms, but not necessarily together. Other techniques might include identifying documents that contain less than all of the one or more search terms, or synonyms of the one or more search terms. Yet other techniques are known to those skilled in the art.

Search engine 125 may then score the documents based on the ranking model described above (act 530). With regard to each document, search engine 125 may identify a new instance (u, q, d) that corresponds to this user search, where u refers to the user, q refers to the search query provided by the user, and d refers to the document under consideration. Search engine 125 may extract the features from the new instance and determine which rules of the ranking model apply. Search engine 125 may then combine the weight of each rule with the prior probability of selection for (u, q, d) to determine the final posterior probability of the user u selecting this document d for query q. Search engine 125 may use the final posterior probability as the score for the document. Alternatively, search engine 125 might use the final posterior probability as one of multiple factors in determining the score of the document.

Search engine 125 may sort the documents based on their scores (act 540). Search engine 125 may then formulate search results based on the sorted documents (act 550). In an implementation consistent with the principles of the invention, the search results may include references to the documents, such as links to the documents and possibly a textual description of the links. In another implementation, the search results may include the documents themselves. In yet other implementations, the search results may take other forms.

Search engine 125 may provide the search results as a HyperText Markup Language (HTML) document, similar to search results provided by conventional search engines. Alternatively, search engine 125 may provide the search results according to a protocol agreed upon by search engine 125 and client 110 (e.g., Extensible Markup Language (XML)).

Search engine 125 may further provide information concerning the user, the query provided by the user, and the documents provided to the user to help improve the ranking model. For example, server 120 may store this information in repository 220 or provide it to one of devices 210 to be used as training data for training the model.

Even Larger Data Sets

When the data set within repository 220 becomes very large (e.g., substantially more than a few million instances), multiple devices 210 may be configured as a distributed system. For example, devices 210 may be capable of communicating with each other and with repository 220, as illustrated in FIG. 2.

According to one exemplary implementation of the distributed system, each device 210 may be responsible for a subset of the instances within repository 220. Each device 210 may possibly store its subset of instances in local memory. Each device 210 may also build its own feature-to-instance index for its subset of instances. As described previously, the feature-to-instance index may facilitate fast identification of correspondence between features and instances by linking features to the instances in which they are included.

One or more devices 210 (or possibly all) may identify candidate conditions to be tested. Suppose that a device 210 "DV" has a candidate condition C that it wants to test (e.g., for which it wants to determine a weight). Device DV may send out a "stats" request to other devices 210 asking for statistics for condition C. For example, device DV may broadcast the stats request that includes (or identifies) the condition C for which device DV desires statistics.

The other devices 210 may receive condition C and use their own feature-to-instance index to find their instances that satisfy condition C. For example, the receiving devices 210 may identify the features making up condition C. Assume, for example, that condition C includes a combination of features fi and fj. The receiving devices 210 may then determine the set of instances that contain those features by intersecting the hitlist for features fi and fj.

The receiving device 210 may then compute statistics about predicted probabilities for those instances. Each receiving device 210 may then send the statistics for the set of matching instances back to device DV. Device DV may use the statistics to estimate a weight for condition C. Device DV may, as described above, determine whether to add the rule containing condition C to the model. If device DV decides to add the rule containing condition C to the model, it may send an "update" request to all of the other devices 210 informing them of the new rule (i.e., the new condition and its weight).

According to another exemplary implementation of the distributed system, multiple devices 210 may be used to further increase throughput and capacity. That is, this implementation can handle more total instances and test more conditions per second. It does this by first generating a collection of conditions to test, and then optimizing them in a batch. It is desirable, however, to be able to update the model everywhere immediately when a new rule is added since correlated conditions cannot be considered in isolation without introducing unacceptable weight oscillations that prevent convergence. Therefore, implementations consistent with the principles of the invention may rapidly feed back the effects of accepted rules into the statistics used to decide the weight of future rules.

As before, the model generation process may be divided into iterations. Rules may be tested or have their weights optimized once per iteration. Each iteration may be broken into two phases: a candidate rule generation phase and a rule testing and optimization phase. The rule testing and optimization phase may determine the weights for conditions generated in the candidate rule generation phase, and accept rules into the model if their benefit (difference in log likelihood) exceeds their cost.

As described previously, there are several possible ways of generating candidate conditions in the candidate rule generation phase. For example, candidate conditions might include all conditions with one feature, all conditions with two features that co-occur in some instance, and all extensions of existing rules by one feature (where the combination is in some instance). It may be beneficial to consider only those conditions that match some minimum number of instances. There are a couple of strategies for accomplishing this: identify conditions that appear multiple times in some fraction of the instances (divided among all of devices 210 and then summed), or identify conditions that appear multiple times on one device 210 and then gather the results together to remove duplicates. As a further optimization, extensions of only those rules added in the last iteration may be determined and added to the candidate rules generated in previous iterations.

The conditions to be tested may be distributed to every device 210. Each device 210 may analyze its share of the instances to identify candidate conditions that match each instance. For example, devices 210 may determine matching conditions for each instance by looking up the features in the instance in a tree data structure. Devices 210 may record information concerning the matching conditions and instances as (condition, instance number) pairs. Each device 210 may sort the (condition, instance number) pairs and use them to iterate through the conditions to collect statistics about predicted probabilities from the matching instances.

For each condition, devices 210 may send the statistics associated with the condition to a device 210 designated to handle that condition (e.g., a device 210 selected, for instance, based on a hash of the condition). When all of the statistics for a given condition have been aggregated on a single device 210, that device 210 may determine the optimal weight of the rule and determine whether the rule should be added to the model M, as described above. The result may be broadcast to all devices 210 (or to those devices that sent statistics). The output of this phase is new weights for all existing rules (possibly zero if the rule is discarded) and a list of new rules.

CONCLUSION

Systems and methods consistent with the principles of the invention may rank search results based on a ranking model that may be generated based, at least in part, on prior information retrieval data, such as data relating to users, queries previously provided by these users, documents retrieved based on these queries, and which of these documents were selected and not selected in relation to these queries.

The foregoing description of preferred embodiments of the present invention provides illustration and description, but is not intended to be exhaustive onto limit the invention to the precise form disclosed. Modifications and variations are possible in light of the above teachings or may be acquired from practice of the invention. For example, while series of acts have been described with regard to FIGS. 4 and 5, the order of the acts may be modified in other implementations consistent with the principles of the invention. Also, non-dependent acts may be performed in parallel. Further, the acts may be modified in other ways. For example, in another exemplary implementation, acts 420-430 of FIG. 4 may be performed in a loop for a number of iterations to settle on a good weight. In the context of multiple devices 210, this may mean that device DV sends out multiple stats requests for a particular condition.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that one of ordinary skill in the art would be able to design software and control hardware to implement the aspects based on the description herein.

What is claimed is:

1. A system, comprising:
   a repository to store training data that includes a plurality of features; and
   one or more devices to:
   select a candidate condition that includes one or more of the features,
   estimate, after selection of the candidate condition, a weight for the candidate condition,
   form a new rule from the candidate condition and the weight,
   compare a likelihood of occurrence of the training data given a model with the new rule and a likelihood of occurrence of the training data given the model without the new rule,
   determine, based on the comparison, that a difference of the likelihood of occurrence of the training data in the repository given the model with the new rule and the likelihood of occurrence of the data in the repository given the model without the new rule is greater than a cost, and add the new rule to the model upon determining that the difference of the likelihood of occurrence of the training data in the repository given the new rule and the likelihood of occurrence of the training data in the repository given the model without the new rule is greater than the cost.

2. The system of claim 1, where the one or more devices are further to repeat the selecting a candidate, estimating a weight, forming a new rule, comparing a likelihood of occurrence of the training data, the determining, and adding the new rule for a number of iterations.

3. The system of claim 1, where the one or more devices are further configured to repeat the estimating a weight, forming a new rule, and comparing a likelihood of occurrence of the training data for a number of iterations.

4. The system of claim 1, where the training data is associated with a plurality of prior searches and the plurality of features include at least one of:
user information corresponding to users who provided search queries,
query data corresponding to the search queries, or
document information corresponding to documents relating to the search queries.

5. The system of claim 1, where when selecting a candidate condition, the one or more devices are to at least one of:
create the candidate condition from combinations of the features,
create the candidate condition from a single one of the features, or
create the candidate condition from a complement of at least one of the features.

6. The system of claim 1, where the features include at least one million features.

7. The system of claim 1, where when estimating the weight, the one or more devices are to determine a weight that maximizes a likelihood of occurrence of the training data given the model.

8. The system of claim 1, where when adding the new rule to the model, the one or more devices are to add the new rule to the model when the likelihood of occurrence of the training data given the model with the new rule is greater than the likelihood of occurrence of the training data given the model without the new rule.

9. The system of claim 1, where the one or more devices include a plurality of devices, where one of the plurality of devices is to:
select the candidate condition,
request information associated with the candidate condition from other devices of the plurality of devices,
receive the requested information from the other devices, and
estimate the weight for the candidate condition based, at least in part, on the requested information.

10. The system of claim 9, where the requested information includes predicted probabilities associated with the candidate condition.

11. The system of claim 9, where the one device is further to transmit information regarding the candidate condition and the estimated weight to the other devices.

12. The system of claim 9, where the training data further includes a plurality of instances, each of the features corresponding to one or more of the instances, each of the instances including information regarding a user, information regarding query data provided by the user, and information regarding documents retrieved based, at least in part, on a search performed using the query data; and
where each of the plurality of devices is responsible for a subset of the instances and includes a feature-to-instance index that maps features to instances to which the features correspond.

13. A method, comprising:
selecting, by one or more processors of one or more computing devices, a candidate condition from a set of training data;
estimating, by one or more processors of the one or more computing devices, a weight for the selected candidate condition;
forming, by one or more processors of the one or more computing devices, a new rule from the selected candidate condition and the estimated weight;
comparing, by one or more processors of the one or more computing devices, a likelihood of occurrence of the training data given a model with the new rule and a likelihood of occurrence of the training data given the model without the new rule;
determining, by one or more processors of the one or more computing devices, based on the comparison, that a difference of the likelihood of occurrence of the training data in the repository given the model with the new rule and the likelihood of occurrence of the training data in the repository given the model without the new rule is greater than a cost, and
adding, by one or more processors of the one or more computing devices, the new rule to the model upon determining that the difference of the likelihood of occurrence of the training data in the repository given the new rule and the likelihood of occurrence of the training data in the repository given the model without the new rule is greater than the cost.

14. A system, comprising:
a repository to store data corresponding to a plurality of prior searches, the data including information regarding users, information regarding query data provided by the users, and information regarding documents retrieved based, at least in part, on searches performed using the query data; and
one or more devices to:
select a candidate condition based, at least in part, on the data in the repository,
estimate a weight for the candidate condition,
form a new rule from the candidate condition and the weight,
compare a likelihood of occurrence of the data in the repository given a model with the new rule and a likelihood of occurrence of the data in the repository given the model without the new rule,
determine, based on the comparison, that a difference of the likelihood of occurrence of the data in the repository given the model with the new rule and the likelihood of occurrence of the data in the repository given the model without the new rule is greater than a cost, and
add the new rule to the model upon determining that the difference of the likelihood of occurrence of the data in the repository given the new rule and the likelihood of occurrence of the data in the repository given the model without the new rule is greater than the cost.

15. The system of claim 14, where the one or more devices are further to:
create rules for the model based, at least in part, on the information regarding the users, the information regarding the query data provided by the users, and the information regarding the documents retrieved based, at least in part, on searches performed using the query data and which of the documents were selected by the users, and store the created rules.

16. The system of claim 14, where when estimating the weight for the candidate condition, the one or more devices are to estimate the weight as a weight that maximizes a log likelihood of occurrence of the data in the repository given the model with the new rule.

17. A method, comprising:
storing, by one or more processors of one or more computing devices, a plurality of instances, each of the instances including information regarding a first user who previously requested a search, information regarding first query data provided by the first user in requesting the search, and information regarding one or more documents retrieved based, at least in part, on the search performed using the first query data or which of the one or more documents were selected by the first user;
creating, by one or more processors of the one or more computing devices, rules for a model based, at least in part, on the instances and features extracted for the instances;
receiving, by one or more processors of one or more server devices, second query data from a second user;
identifying, by one or more processors of the one or more server devices, documents related to the second query data;
assigning, by one or more processors of the one or more server devices, a score to each of the identified documents based, at least in part, on the model, the score for one of the identified documents reflecting a prediction of whether the second user will select the one of the identified documents when the second user provides the second query data; and
outputting, by one or more processors of the one or more server devices, information regarding one or more of the identified documents based, at least in part, on the score for the one or more of the identified documents,
where the creating the rules for the model includes:
selecting a candidate condition based, at least in part, on the instances,
estimating a weight for the candidate condition,
forming a new rule from the candidate condition and the weight,
comparing a likelihood of occurrence of the instances given the model with the new rule and a likelihood of occurrence of the instances given the model without the new rule,
determining, based on the comparison, that a difference of the likelihood of occurrence of the instances given the model with the new rule and the likelihood of occurrence of the instances given the model without the new rule is greater than a cost, and
adding the new rule to the model upon determining that the difference of the likelihood of occurrence of the instances given the new rule and the likelihood of occurrence of the instances given the model without the new rule is greater than the cost.

18. The system of claim 5, where the created candidate condition relates at least two of the features with a Boolean operator.

19. A computer-readable memory device storing instructions executable by one or more processors, the instructions comprising:
one or more instructions for selecting a candidate condition from a set of training data;
one or more instructions for estimating a weight for the selected candidate condition;
one or more instructions for forming a new rule from the selected candidate condition and the estimated weight;
one or more instructions for comparing a likelihood of occurrence of the training data given a model with the new rule and a likelihood of occurrence of the training data given the model without the new rule;
one or more instructions for determining, based on the comparison, that a difference of the likelihood of occurrence of the training data in the repository given the model with the new rule and the likelihood of occurrence of the training data in the repository given the model without the new rule is greater than a cost, and
one or more instructions for adding the new rule to the model upon determining that the difference of the likelihood of occurrence of the training data in the repository given the new rule and the likelihood of occurrence of the training data in the repository given the model without the new rule is greater than the cost.

* * * * *